US010659411B2

(12) United States Patent
Lewis et al.

(10) Patent No.: US 10,659,411 B2
(45) Date of Patent: *May 19, 2020

(54) NOTIFICATION FORWARDING

(71) Applicant: Google LLC, Mountain View, CA (US)

(72) Inventors: Justin Lewis, Marina del Rey, CA (US); Gavin James, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,810

(22) Filed: Apr. 24, 2019

(65) Prior Publication Data

US 2019/0253375 A1 Aug. 15, 2019

Related U.S. Application Data

(63) Continuation of application No. 15/373,759, filed on Dec. 9, 2016, now Pat. No. 10,305,835.

(51) Int. Cl.
*H04L 12/58* (2006.01)
*H04L 29/08* (2006.01)
*H04L 29/06* (2006.01)

(52) U.S. Cl.
CPC ............ *H04L 51/14* (2013.01); *H04L 67/306* (2013.01); *H04L 67/36* (2013.01); *H04L 67/42* (2013.01); *H04L 69/24* (2013.01)

(58) Field of Classification Search
CPC ....... H04L 51/14; H04L 67/306; H04L 67/36; H04L 67/42
See application file for complete search history.

(56) References Cited

U.S. PATENT DOCUMENTS

| 7,496,630 | B2 | 2/2009 | Arellano et al. |
| 2004/0010592 | A1 | 1/2004 | Carver et al. |
| 2009/0187980 | A1* | 7/2009 | Tung ................... H04L 63/0823 726/6 |

(Continued)

OTHER PUBLICATIONS

Cervantes, E., "Pushbullet can now send notifications to any other Android devices!", Android Authority, May 22, 2014, 3 pages.

(Continued)

*Primary Examiner* — El Hadji M Sall
(74) *Attorney, Agent, or Firm* — Lowenstein Sandler LLP

(57) ABSTRACT

An online system determines a client device associated with a user that is to receive a new notification. The client device presents the notification and receives an input to forward the notification to a different client device and/or a different application. The client device sends a request to the online system to forward the notification. The online system determines a list of available client devices and/or available applications that are able to receive a forwarded version of the notification and provides the list to the client device for selection. Upon receiving a selection, the client device sends the selection to the online system which generates the forward notification that is appropriate for the selected client device and/or selected application. Thus, the online system avoids over-notifying a user, while also enabling the user to consume the content of the notification according to his/her preferences.

20 Claims, 6 Drawing Sheets

(56) References Cited

U.S. PATENT DOCUMENTS

2017/0178110 A1* 6/2017 Swanson ............. G06Q 20/223

OTHER PUBLICATIONS

Hildenbrand, J., "Remote Notifier for Android—forward notifications from phone to computer", Androidcentral, Sep. 9, 2010, Mobile Nations, 12 pages.

Ravenscraft, E., "How to Use Pushbullet to Bridge the Gap Between All Your Devices", Life Hacker, Dec. 11, 2014, 14 pages.

Reddit Inc., Comments regarding Pushbullet, "Did notification mirroring/forwarding between Android get removed? My notifications only show up in Chrome", 2017, 4 pages.

Webpage for KLONE, "Forward Android Notifications to your iPad", 2014, 5 pages (http://www.kloneapp.com).

* cited by examiner

NOTIFICATION FORWARDING

CROSS-REFERENCE TO RELATED APPLICATIONS

This application is a continuation application of U.S. patent application Ser. No. 15/373,759, filed Dec. 9, 2016, which is incorporated herein by reference in its entirety.

BACKGROUND

This disclosure generally relates to content notifications, and more specifically, to forwarding a notification to a different client device or a different application.

Content notifications are provided to users in order to ensure that users are notified when content that they are interested in is available for consumption. However, as the number of different devices increases per user (e.g., mobile device, tablets, laptops, desktops, etc.), it is problematic to send a single notification to every device that a user owns. For example, sending the same notification to all devices registered with a user risks becoming an annoyance because after a user views a notification on one device, the notifications on the other devices are stale. However, if a notification was only sent to a single device to minimize the number of notifications across devices, the user may prefer to consume the content associated with the notification on a different device. For example, a user may receive a notification regarding a new video content on the user's mobile device however, the user may prefer to watch the video content on the larger screen of his/her tablet or television. Overall, these drawbacks may result in the user disabling the notifications altogether, which is detrimental because it prevents the user from being notified of new content that may be of interest to him/her.

SUMMARY

An online system delivers a notification to a single client device that is registered with a user in order to eliminate the drawback of a user receiving the same notification across multiple client devices. Additionally, the online system enables a user of the client device to forward the notification to a different client device and/or a different application. Thus, the user can consume the content associated with the notification on a device and/or application of his/her choice.

A notification is triggered by the arrival of new content. As an example, in the context of YouTube, if a first user uploads a new video content, then other users that have subscribed to that first user receive a notification indicating that new video content of the first user is now available for consumption. Given that users today often have multiple client devices and various applications installed on each client device, the online system determines which client device and which application to send a notification to. For example, the online system can choose to send a notification to a client device that is currently being used by the user as opposed to another device. In many scenarios, this is a mobile device because they are transportable and designed to be readily accessible to users.

However, in many scenarios, users may prefer to use another client device or application to consume the content associated with the notification. Therefore, the online system generates a notification that includes an option to forward the notification to a different device and/or application. Upon receiving the notification on the client device, a user can provide an input indicating his/her desire to forward the notification. The online system determines a list of other client devices that are registered with the user or other applications that can receive a forwarded version of the notification. If there are multiple other client devices and/or applications that can receive a forward notification, the online system sends the list to the client device such that the client device can query for a selection of a device and/or application that will receive the forward notification. Once the client device receives a selection of a device and/or application, a request, such as a remote procedure call (RPC), is sent from the client device to the online system. In other embodiments, there may only be one other client device or one other application that is able to receive a forward notification. Therefore, the online system automatically generates a forward notification appropriate for the second client device or second application without waiting for a selection of a client device and/or application.

An appropriate forward notification is one that the second client device or second application is able to handle. For example, in some cases, certain client devices do not support technical capabilities of the content. A television typically does not support conversation capabilities. Therefore, a forward notification regarding the conversation might be converted into a plain video reference for a television (which can handle the video but not the conversation).

Figure 1:
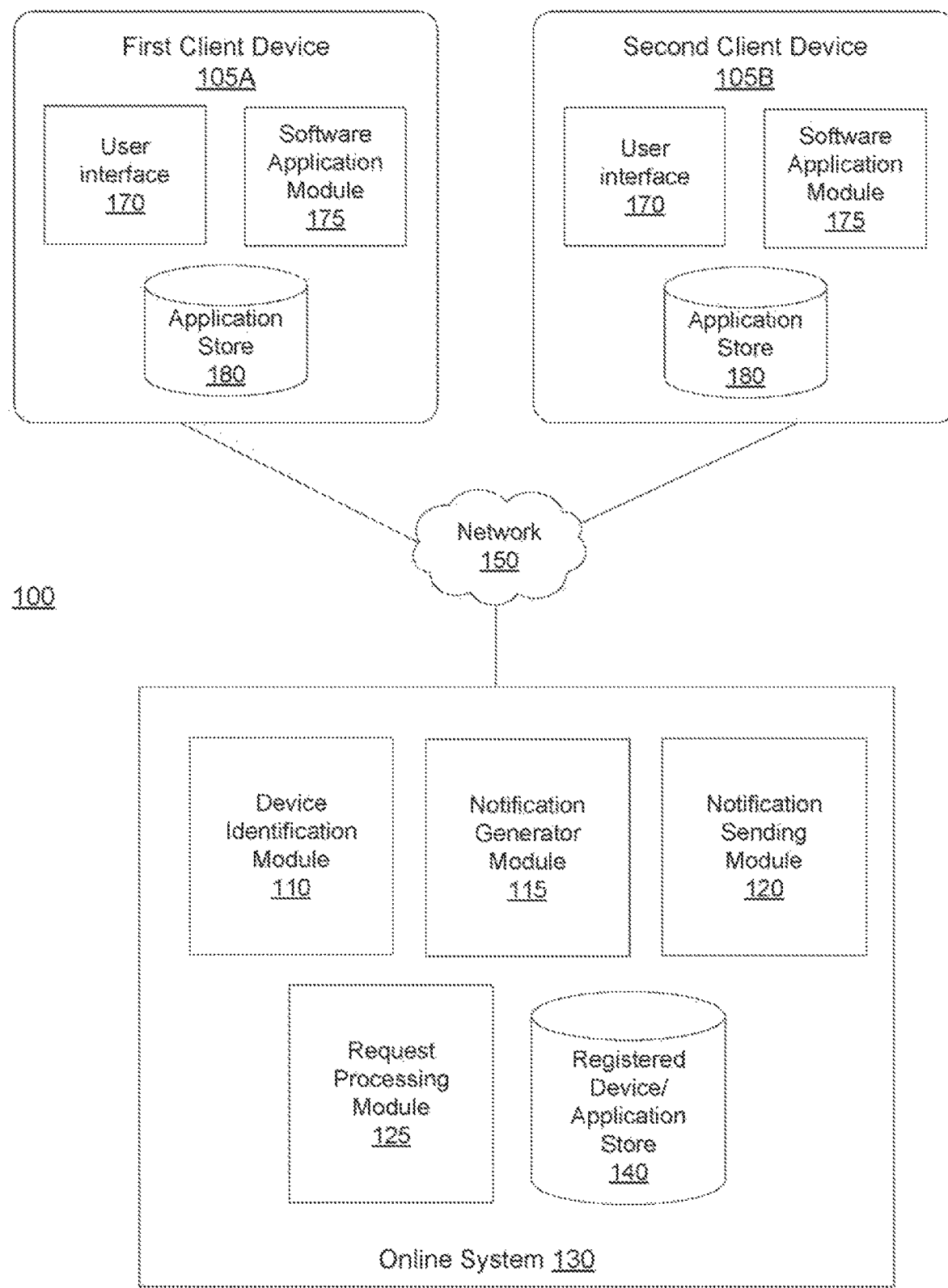
FIG. 1 is a system environment of an online system for forwarding notifications, in accordance with an embodiment.

The figures depict various embodiments for purposes of illustration only. One skilled in the art will readily recognize from the following discussion that alternative embodiments of the structures and methods illustrated herein may be employed without departing from the principles of the invention described herein. Additionally, the figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral (e.g. "client device 105" in the text refers to reference numerals "first client device 105a" and/or "second client device 105b" in the figures).

DETAILED DESCRIPTION

Overview of System Environment

FIG. 1 depicts a system environment 100 of an online system 130 for forwarding notifications, in accordance with an embodiment. The system environment 100 includes an online system 130, one or more client devices 105A and 105B, and a network 150. Although FIG. 1 depicts two client devices 105, one skilled in the art may appreciate that any number of client devices 105 may exist in the system architecture 100 in communication with the network 150 and the online system 130. Further reference will be made in regards to FIG. 2A which depicts the forwarding of a notification. Additionally, reference will be made in regards to FIG. 2B which depicts a forward notification.

In a first embodiment, the online system 130 forwards the notification from the first client device 105A to a second client device 105B (hereafter referred to as the device-to-device embodiment). In this embodiment, the system environment 100 includes a first client device 105A and a second client device 105B. In a second embodiment, the online system 130 forwards the notification from a first application on a client device 105 to a different application installed on the same client device 105 (hereafter referred to as the app-to-app embodiment). Therefore, in this embodiment, the system environment 100 includes a single client device 105 given that a notification is forwarded to a different application of the same client device 105. In a third embodiment, the online system 130 forwards the notification from the first client device 105A to be handled by a particular application on the second client device 105B (hereafter referred to as the app/device-to-app/device embodiment).

Turning to the individual entities illustrated in FIG. 1, one or more client devices 105 are connected to an online system 130 through a network 150. The network 150 may be any wired or wireless local area network (LAN) and/or wide area network (WAN), such as an intranet, an extranet, or the Internet. In various embodiments, the network 150 uses standard communication technologies and/or protocols. Examples of technologies used by the network 150 include Ethernet, 802.11, 3G, 4G, 802.16, or any other suitable communication technology. The network 150 may use wireless, wired, or a combination of wireless and wired communication technologies. Examples of protocols used by the network 150 include transmission control protocol/Internet protocol (TCP/IP), hypertext transport protocol (HTTP), simple mail transfer protocol (SMTP), file transfer protocol (TCP), or any other suitable communication protocol. Additionally or alternatively, specialized application software that runs natively on a client device 105 is used as an interface to connect to the network 150. For example, a client device 105 may communicate with the network 150 through a software application previously installed on the client device 105.

Example Client Device

Each client device 105 is a computing device that processes information for forwarding a notification by transmitting and/or receiving data via the network 150. Examples of client devices 105 include desktop computers, laptop computers, tablet computers (pads), mobile phones, personal digital assistants (PDAs), gaming devices, smart home device (smart television, smart assistant) or any other electronic device including computing functionality and data communication capabilities.

Figure 6:
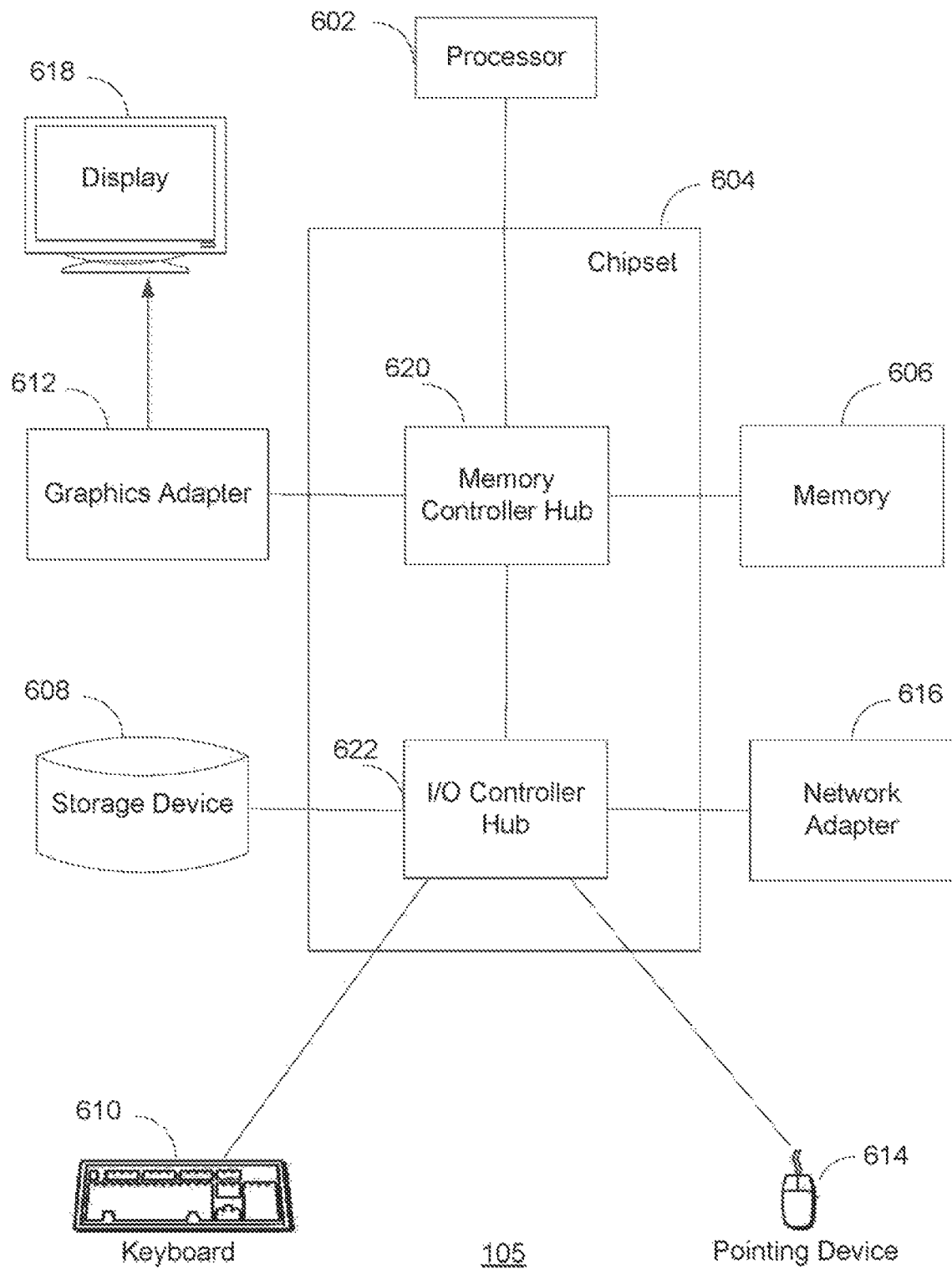
FIG. 6 depicts an example client device in the system environment, in accordance with an embodiment.

Reference is now made to FIG. 6 which illustrates an example client device 105 for implementing the entities shown in FIG. 1. The client device 105 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input device 614, and network adapter 616 are coupled to the I/O controller hub 622. Other embodiments of the client device 105 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input device 614 is a touch-screen interface, a mouse, track ball, or other type of pointing device, a keyboard, an auditory input device, or some combination thereof, and is used to input data into the client device 105. In some embodiments, the client device 105 may be configured to receive input (e.g., commands) from the input device 614 from the user. The graphics adapter 612 displays images and other information on the display 618. The network adapter 616 couples the client device 105 to one or more computer networks.

The client device 105 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

Returning to FIG. 1, each client device 105 includes at least one software application 175 and a user interface 170 for forwarding notifications. Additionally, each client device 105 includes an application store 180 (e.g., storage device 608), to which the client device 105 stores previously installed applications. The software application 175 includes computer program code configured to be executed by the processor 602 to execute operations associated with an application stored in the application store 180. For example, an operation may be the display of a notification for the software application 175. Generally, such software applications executed by the processor 602 are designed to operate in conjunction with an operating system of a client device 105 (e.g., Android, iOS, Windows). A software application 175 may rely on functions made available by the operating system, such as functions identifying other applications installed on the device that can be used in the process for forwarding a notification.

The user interface 170 is configured to present information to and receive input from a user of the client device 105 and may be part of a software application or part of the operating system of the client device 105. For example, user interfaces 170 receive input (e.g., a user input or user selection) through input devices (e.g., keyboard 610 and/or input device 614) that are connected to the client device 105. They output information such as a notification for a software application 175 and/or operating system through an associated display 618. As one example, particular software applications may have specifications (e.g., code) about the appearance (e.g., color and placement/choice of graphical elements) of a new or forward notification on the user interface 170.

Example Online System

Returning to the system environment 100 in FIG. 1, the online system 130 includes a device identification module 110, a notification generator module 115, a notification sending module 120, and a request processing module 125 that collectively perform the steps of sending a new notification to a client device 105 and subsequently forwarding the notification to a different client device 105 and/or a different application.

The online system 130 sends new notifications and forward notifications to client devices 105. Generally, users associated with client devices 105 have a user account that is associated with the online system 130. For example, the client device 105 may have a particular application installed that corresponds to the online system 130 and the user account is logged in on the installed application such that the client device 105 can provide the services of the online system 130 made available in conjunction with the application. The installed application may be a built in application associated with the operating system of the client device 105 (e.g., a chat application for iOS). As another example, the installed application may be a software application 175 that a user installs onto the client device 105.

A new notification can be triggered by the availability of new content. For example, in the example context of an online video sharing computer system such as YOUTUBE, a new notification may be a video notification notifying a user account through a corresponding application installed on the client device 105 that a new video has been posted that has been determined to be of interest. As another example, an example notification may be a chat notification that notifies a user account that a new chat message has been received. Therefore, the chat notification can be presented by a built in application of an operating system of a client device 105. Other example types of notifications include, but are not limited to, music content notifications, advertisement notifications (e.g., a new sale or a discount for a product), email notifications, and social media notifications (e.g., new content available on a social media platform). A forward notification refers to a new notification that has been forwarded. As previously stated, this may occur in a device-to-device, app-to-app, or app/device-to-app/device manner.

Figure 2A:
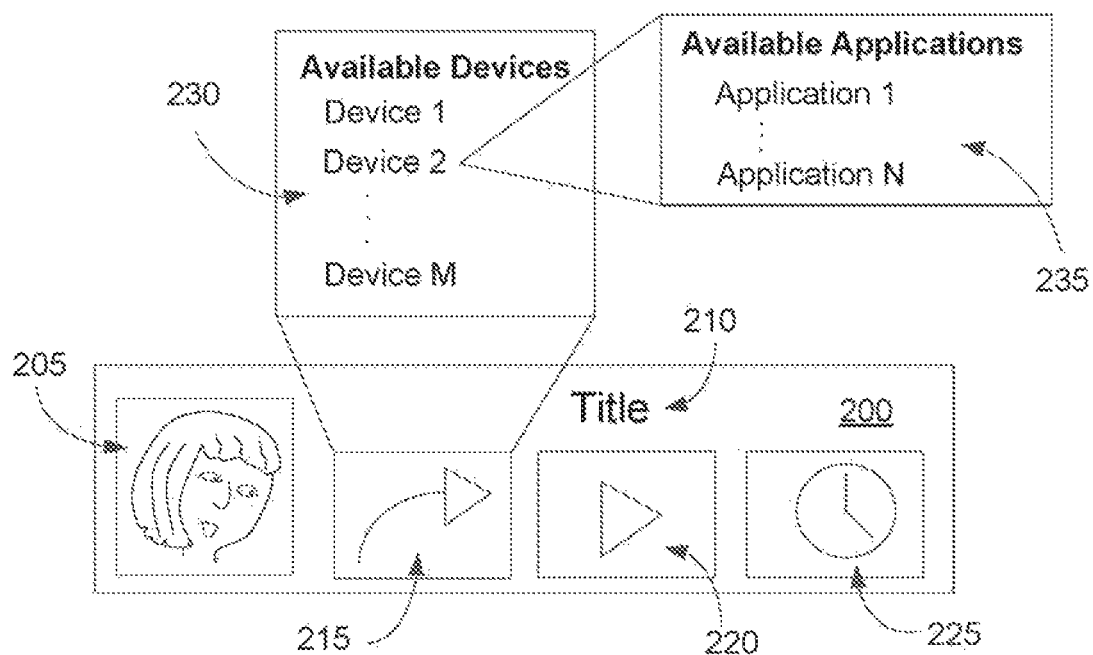
FIG. 2A illustrates the forwarding of a notification by a first client device, in accordance with an embodiment.
Figure 2B:
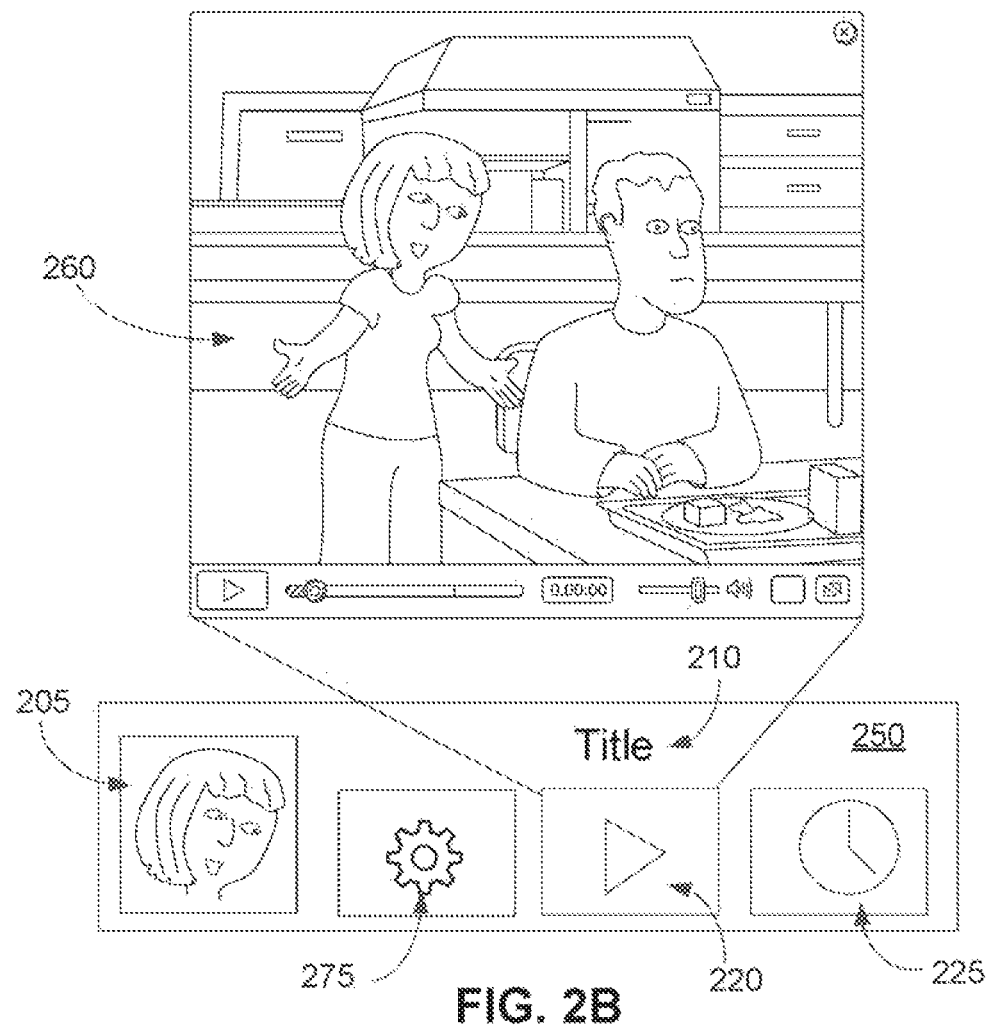
FIG. 2B depicts a forward notification, in accordance with an embodiment.

Reference is now made to example embodiments of a new notification 200 and forward notification 250 depicted in FIGS. 2A and 2B, respectively. The new 200 and forward 250 notification each includes various graphical elements (e.g., 215, 220, 225, and 275) that each correspond to an action that is executed by the client device 105 upon receiving a selection of the corresponding graphical element.

Each notification is associated with an identifier of a content (e.g., a video, a chat message, a music file) that corresponds to the notification. The identifier of the content is herein referred to as a serialized payload. In the new notification 200 depicted in FIG. 2A, the serialized payload for this new notification corresponds to a new video that is available for viewing. For example, the new notification 200 includes graphical elements 215, 220, and 225 that respectively correspond to the actions of forwarding the notification, playing the video, and saving to watch the video at a subsequent time point. FIG. 2B depicts a forward notification 250 that is forwarded to a second client device 105B. In this example, the second client device 105B is also able to handle the video, and therefore also includes graphical elements 220 and 225 that correspond to play and watch later actions, respectively. In the examples depicted in FIG. 2A and FIG. 2B, both the new notification 200 and forward notification 250 further include descriptors such as a title 210 and a representative image 205 that describes the video content.

Identifying a Device/Application to Receive a Notification

The device identification module 110 is responsible for determining which client device 105 associated with a user account is to receive a notification, both in the scenario where the notification is a new notification and in the scenario where the notification is a forward notification. Referring specifically to scenario of a new notification, in order to reduce notification spam across multiple client devices, the device identification module 110 selects one client device 105 from the registered client devices 105 to receive the new notification. The device identification module 110 retrieves the list of client devices 105 associated with a user account of the online system 130 and/or available applications that are installed on each client device 105. This information is retrieved from the registered device/application store 140. Each of the registered client devices 105 is previously authenticated. For example, the user of the online system 130 may be currently logged into a user account on each of the client devices 105 and each client device 105 is available to receive a new notification on behalf of the user account.

The device identification module 110 may utilize various data to select the client device 105 where the user would have the highest likelihood of interacting with the new notification as compared to the likelihood of the user interacting with the new notification on other client devices 105. As one example, the device identification module 110 selects the client device 105 that the user of the online system 130 has most recently accessed, is currently accessing, or accesses most frequently. As another example, the device identification module 110 selects a client device 105 based on other use habits of the user. If a new notification is to be sent during work hours on a weekday and the user is typically at work during that time, the device identification module 110 can choose to send the notification to the user's mobile device as opposed to the user's home desktop computer. In one embodiment, the device identification module 110 defaults to a particular selection method that chooses the client device 105 or uses a selection method that has been chosen by the user in the application settings.

The device identification module 110 may further determine whether the notification is specific for an application on the selected client device 105 and determine which application to use to send the notification. This is particularly relevant to the app-to-app and app/device-to-app/device embodiments. For example, if the notification is an online video service notification, the device identification module 110 automatically selects the online video service application as the preferred application. If the notification can be handled by more than one installed application on the selected client device 105, the device identification module 110 selects a preferred application. For example, a music content notification may be able to be handled by more than one music application installed on the client device 105. In one embodiment, the preferred application is the most commonly used application that can handle the notification. In another embodiment, the preferred application is the most recently used application that can handle the notification. In another embodiment, the device identification module 110 selects the client device 105 using a selection method that has been chosen by the user in the application settings.

In identifying the preferred application, the device identification module 110 also identifies other applications installed on the selected client device 105 that are able to receive the notification and generates a list. For example, the device identification module 110 can determine that in addition to the preferred application, the client device 105 only has one other installed application that can handle the notification. Therefore, the device identification module 110 informs the notification generator module 115 and notification sending module 120 to provide a notification such that if the client device 105 requests to forward the notification to a different application on the same client device 105, the only other application that is able to handle the notification is automatically invoked on the client device 105.

Referring now to the scenario where a forward notification is to be sent, the device identification module 110 also conducts a similar analysis of additional client devices 105 that can receive a forward notification. More specifically, the device identification module 110 identifies the client devices 105 that are registered with the user account of the online system 130 in addition to the selected client device 105 (e.g., first client device 105A). In one scenario, the online system 130 can recognize that the user account is logged in with a first client device 105A and only one other client device 105 (e.g., a second client device 105B). Therefore, if the first client device 105A were to send a forward request to forward the notification, the device identification module 110 can readily identify that the second client device 105B is the only other client device available for notification forwarding. Thus, the online system 130 can skip the step of asking for a client device 105 to forward the notification to.

In the scenario where the device identification module 110 identifies only one additional client device 105B and/or one application that can handle the forward notification, the online system 130 automatically proceeds with generating a forward notification for the application on the second client device 105B and/or the one application.

Alternatively, in the scenarios where the device identification module 110 identifies more than one other client device 105 and/or more than one other application that are able to receive a notification, the device identification module 110 prompts the request processing module 125 to send a request for input for a second client device 105B and/or a second application that is to receive the forward notification.

Generating a Notification

The notification generator module 115 generates a notification according to the selected client device 105 and/or the selected application on the selected client device 105 that is to receive a notification (either a new notification or a forward notification). The notification generator module 115 receives an identification of the selected client device 105 and/or selected application from the device identification module 110 and generates a new or forward notification that the selected client device 105 and/or preferred application can appropriately handle. For a selected client device 105, the notification generator module 115 determines the category (e.g. mobile device, laptop, desktop, television) of the client device 105 which determines the capabilities of that client device 105. For example, a notification may correspond to a chat message. However, if the selected client device 105 is unable to handle chats (e.g., a television without a keyboard), the notification generator module 115 generates an appropriate notification including an option to view the chat as opposed to an option to respond to the chat. Thus, the notification generator module 115 is able to generate the notification (e.g., both new and forward notifications) based on the capabilities of the client device 105 that will receive the notification.

Referring again to the notification displayed in FIG. 2A, the notification generator module 115 generates a new notification that has appropriate graphical elements (e.g., forward 215, play 220, watch later 225 graphical elements) associated with the serialized payload of this new notification 200. Example forward notification 250 in FIG. 2B depicts, in comparison to new notification 200 depicted in FIG. 2A, a settings graphical element 275 that has replaced forward graphical element 215. Given that the forward notification 250 is now forwarded, it is unlikely that it will need to be forwarded again, and therefore, the forward graphical element 215 is replaced. In some scenarios, a forward notification adds additional graphical elements and/or removes graphical elements as opposed to or in addition to replacing graphical elements in a new notification. One possible replacement graphical element 275 corresponds to a settings action that pulls up additional options and/or settings associated with the notification. Furthermore, given that the forward notification 250 depicted in FIG. 2B corresponds to a video content notification, and assuming the client device 105 that receives the forward notification can recognize that the video has a video endpoint, in one embodiment the client device 105 begins pre-caching the video content upon receiving the forward notification 250. If the selectable play graphical element 220 is selected, the client device 105 begins playing the video content 260 in a separate window. Alternatively, a selection of the play graphical element 220 can invoke the designated application and cause the video content 260 to begin playing in the designated application.

In some embodiments, the appearance (e.g., color, size, location on the display, inclusion/placement of graphical elements) of the notification can be pre-determined by the application. Therefore, the notification generator module 115 generates the notification according to the pre-determined settings of the application.

Sending a Notification

Returning to FIG. 1, the notification sending module 120 transmits the generated notification and any additional information to the selected client device 105. The process undertaken by the notification sending module 120 is different based on whether the notification sending module 120 is transmitting a new or forward notification. If the notification sending module 120 is transmitting a new notification to the selected client device 105, the notification sending module 120 may transmit, in addition to the notification itself, a serialized payload rather than the full content (e.g., video, chat, music). This saves the resources of the online system 130 because if the client device 105 then requests to forward the notification to a second client device 105B, the notification sending module 120 only consumes minimal resources in sending a serialized payload as opposed to sending the full content. The notification sending module 120 associates the serialized payload with an identifier of the client device 105 that is sent the notification. Therefore, at a subsequent time, the online system can retrieve the serialized payload and recognize that the client device 105 is requesting to forward the notification.

If the notification sending module 120 is transmitting a forward notification to a second client device 105B, the notification sending module 120 can include additional information that helps the second client device 105B and/or a selected application handle the forward notification. For example, the notification sending module 120 can include portions of the content with the forward notification such that the second client device 105B can begin pre-caching the content upon receiving the forward notification. As another example, the notification sending module 120 can include additional code along with the forward notification. When the forward notification is selected (e.g., when the play graphical element 220 of the notification is selected), the code invokes the selected application on the second client device 105B to appropriately handle the content associated with the notification.

Processing Requests for Forwarding Notifications

The request processing module 125 receives different requests from client devices 105 regarding notifications and interprets each request accordingly. Generally, these requests are to forward a notification. Depending on the embodiment (e.g., device-to-device forwarding, app-to-app forwarding, or app/device-to-app/device forwarding), the request processing module 125 uses a different method as described further below.

In the device-to-device embodiment, the request processing module 125 receives a forward request (e.g., a RPC) specifying that the notification is to be forwarded to a different client device 105. A forward request refers to an indication that the notification is to be forwarded which, in some embodiments, further includes the serialized payload that was originally included in the new notification to the first client device 105A. Therefore, the request processing module 125 can use the serialized payload to identify that the forward request is originating from a first client device 105A that was previously sent the same serialized payload. The request processing module 125 retrieves the list of other registered client devices 105 where the user account associated with the online system 130 is currently logged in and able to receive the forward notification. The request processing module 125 sends the list of registered client devices 105 to the first client device 105A for selection. At a subsequent time, the request processing module 125 receives a delivery request from the first client device 105A. A delivery request includes a selection of a second client device 105B that is to receive the forward notification. The request processing module 125 passes along the selected second client device 105B to the notification generator module 115 to generate an appropriate forward notification.

In the app-to-app embodiment, the request processing module 125 receives a forward request and additionally, a stored list of installed applications that are installed on the client device 105 that originally received the new notification. The request processing module 125 selects appropriate applications installed on the client device 105 that can receive a forward notification. In one embodiment, the request processing module 125 can use a stored whitelist of applications that are previously determined to be able to receive a forward notification and compares the stored whitelist to the list of applications installed on the client device 105. For example, if the new notification is a music content notification, then the stored whitelist of applications includes music applications that can handle music content. The request processing module 125 identifies the applications installed on the client device 105 that are also on the whitelist and sends a list of these identified applications to the client device 105 for selection.

In the app/device-to-app/device embodiment, the request processing module 125 receives a forward request specifying that the notification is to be forwarded to a different client device 105. Additionally, the request processing module 125 also receives information regarding the installed applications that are available on the client devices 105 that are registered with the user account. In one embodiment, the installed applications of each client device 105 are stored in the registered device/application store 140 and are originally stored by the online system 130 when the application was installed on each client device 105. In other embodiments, the request processing module 125 requests for a list of the up-to-date installed applications on each client device 105.

The request processing module 125 generates a de-duplicated list including the client devices 105 registered with the user account and available applications on each client device 105 that can receive the forward notification. For example, a de-duplicated list ensures that if a client device 105 has multiple installed applications that can receive a forward notification, the client device 105 is only displayed once in the de-duplicated list. Therefore, this ensures that a provided list does not include the same client device 105 multiple times that each correspond to an installed application on the same client device 105. For example, FIG. 2A depicts one embodiment of how a de-duplicated list may be displayed on a user interface 170 of a client device 105. The request processing module 125 sends the de-duplicated list to the first client device 105A for selection. The selection of a second client device 105B and second application is received by the request processing module 125 in a delivery request from the first client device 105A. Thereafter, the request processing module 125 passes along the selected second client device 105B and the selected second application to the notification generator module 115 to generate an appropriate forward notification.

Forwarding a Notification from Device-to-Device

Figure 3:
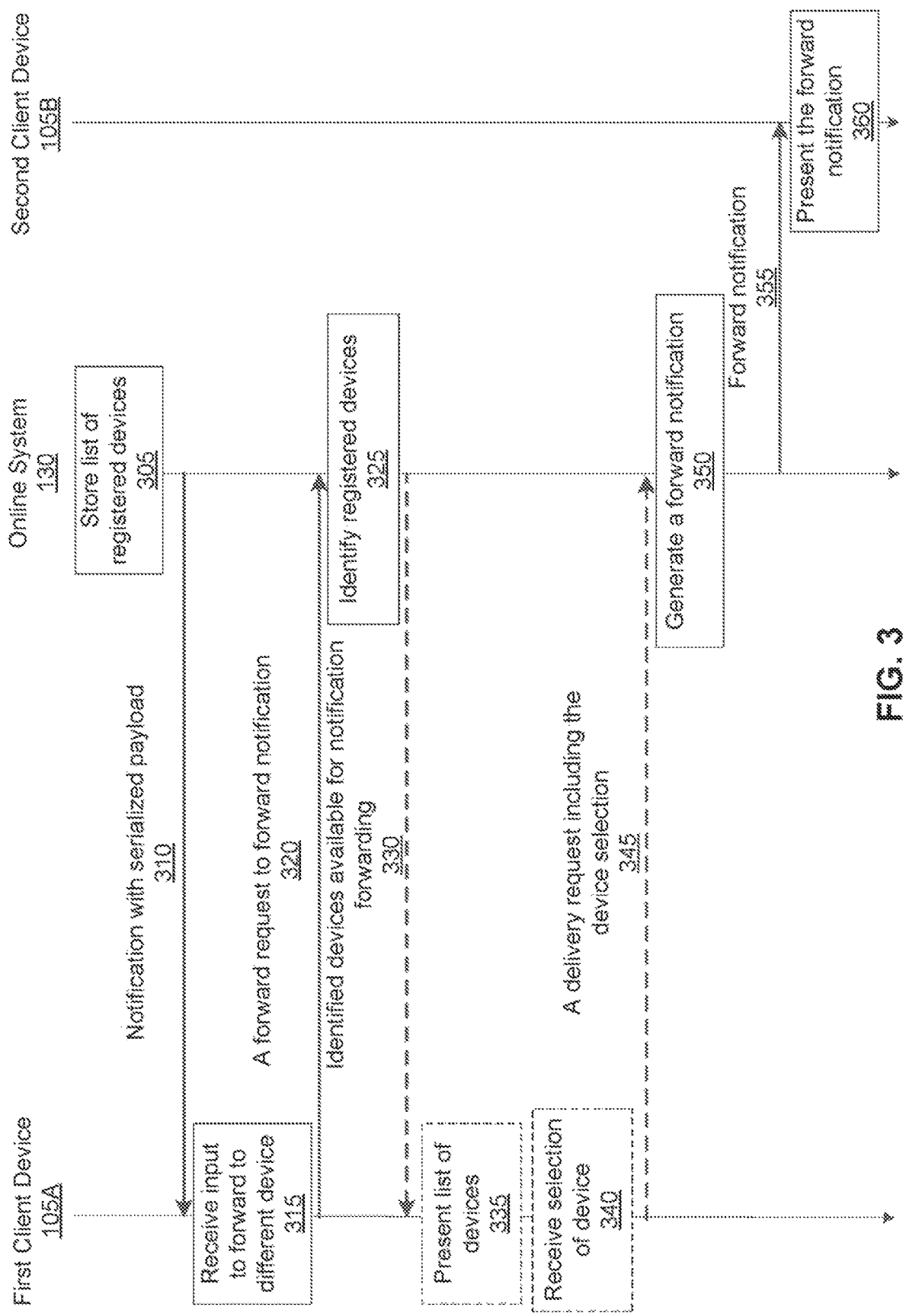
FIG. 3 depicts an interaction diagram for forwarding notifications from a first client device to a second client device, in accordance with an embodiment.

FIG. 3 depicts an interaction diagram for forwarding notifications from a first client 105A device to a second client device 105B, in accordance with an embodiment. In one scenario, a user account is logged in on multiple client devices 105 that can receive notifications (e.g., a mobile device, a laptop, a tablet, a smart television). The steps shown in the interaction diagram (e.g., steps 305-360) depict a process for forwarding a notification from a first client device 105A to a second client device 105B when a user is logged into a user account on two or more client devices 105 (in addition to the first client device 105A) that are available to receive notifications. In another scenario, a user is logged into a user account on only a first client device 105A and a second client device 105B. Steps 305-325 and steps 350-360 (shown in solid lines) in the interaction diagram depict the process of forwarding a notification for this scenario.

The online system 130 stores 305 a list of registered client devices 105, each registered client device 105 on the list associated with a user account of the online system 130. As an example, the user has previously provided login credentials of a user account to each of the client devices 105, is currently logged in to each client device 105, and each client device 105 is available to receive notifications. When a trigger for a notification occurs (e.g., new content is available), the online system 130 chooses a first client device 105A from the list of registered client devices 105 and sends 310 a notification with a serialized payload identifier corresponding to the content to the first client device 105A.

The first client device 105A receives a new notification from the online system 130 through the network 150 and presents the received notification on the user interface 170 of the first client device 105A. Referring again to FIG. 2A, in one embodiment, the notification 200 includes selectable graphical elements 215, 220, and 225. The first client device 105A receives 315 an input through the user interface 170 on a graphical element that indicates a desire to forward the notification to a different client device 105. The first client device 105A sends 320 a forward request to the online system 130. As one example, the forward request is a RPC sent to the online system 130. The forward request also includes additional information that enables the online system 130 to identify that the forward request is sent by the first client device 105A. For example, the forward request can also include the serialized payload. Therefore, the online system 130 can match the serialized payload that was originally sent in order to identify that the forward request is sent by the first client device 105A. As another example, the forward request includes a device identifier of the first client device 105A such that the online system 130 can readily identify the first client device 105A.

The online system 130 receives the forward request and identifies 325 the other registered client devices 105 that are available to receive a forwarded notification using the serialized payload or the identifier of the first client device 105A received in the forward request. The online system 130 identifies the stored list of registered client device 105 associated with the user account of the online system 130 that includes the first client device 105A. If the stored list of registered client devices 105 has two or more additional devices (e.g., two or more in addition to the first client device 105A) that are available to receive a notification, the online system 130 provides 330 the identified list of client devices 105 to the first client device 105A for selection. Alternatively, if the stored list of registered client devices 105 only has one other additional device (e.g., one device in addition to the first client device 105A), the online system proceeds to generate 350 a forward notification. Generating a forward notification is described further below.

In the scenario where the online system provides 330 the stored list of client devices 105, the first client device 105A receives and presents 330 the list of registered client devices 105 that are available for notification forwarding on a user interface 170. Referring again to example embodiment in FIG. 2, the first client device 105A presents the list 230 of available devices (e.g., Device 1 to Device M) on the user interface 170. The first client device 105A receives 340 a selection of a client device 105 (e.g., Device 2) from the list and sends 345 a delivery request that identifies the selected client device (e.g., the second client device 105B). As an example, the delivery request is a RPC sent to the online system 130.

The online system 130 generates 350 a forward notification that is to be sent to the second client device 105B. In some embodiments, the online system 130 identifies a category of the second client device 105B and its capabilities (e.g., mobile device with chat capabilities, smart television without chat capabilities) and generates the forward notification while ensuring that the second client device 105B is able to appropriately handle the actions included in the forward notification. For example, if the notification is to be forwarded from a first mobile device to a second mobile device that have similar capabilities, the online system 130 can generate a similar forward notification or re-use the new notification as the forward notification. Alternatively, if the new notification is a new chat message and is to be forwarded to a second client device 105B without chat capabilities, the online system 130 generates a forward notification that includes a "view" action option as opposed to a "respond" action option. Once the forward notification is generated, the online system sends 355 the forward notification to the second client device 105B. The second client device 105B receives the forward notification and presents 360 the forward notification on a user interface 170 of the second client device 105B. In various embodiments, the second client device 105B can begin pre-caching the content associated with the forward notification in anticipation of a user input to access the content.

Forwarding a Notification from App-to-App

Figure 4:
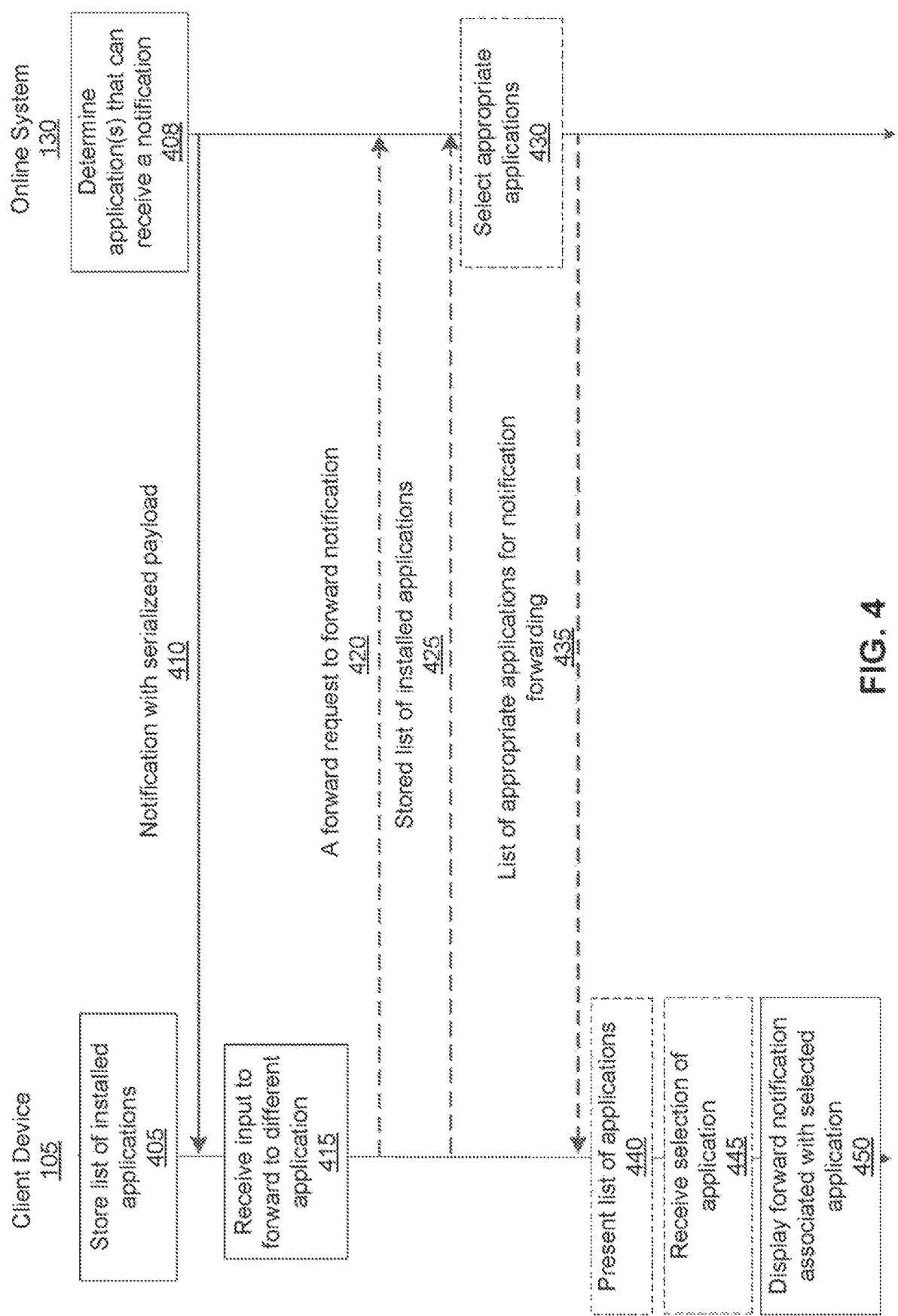
FIG. 4 depicts an interaction diagram for forwarding notifications from a first application on a client device to a second application on the same client device, in accordance with an embodiment.

FIG. 4 depicts an interaction diagram for forwarding notifications from a first application on a client device to a second application on the client device, in accordance with an embodiment. In a first scenario, if a client device 105 receives an input to forward a notification to a different application, the client device 105 invokes instructions that automatically forward a notification of a first application to a second application. For example, if a client device 105 only has installed a first music and a second music application, a request to forward a music notification on the first music application automatically forwards the notification to the second application. The steps for this first scenario are depicted in solid lines (e.g., steps 405-415 and 450). In a second scenario, the client device 105 includes a variety of applications that can receive a forward notification. This second scenario includes all steps in the interaction diagram (e.g., steps 405-450).

A client device 105 stores 405 a list of installed applications on the client device 105. The list of installed applications can be continuously updated whenever a new application is installed or at a pre-determined time interval. The storage and updating of the list of installed applications can occur at the operating system level or at the application level. This is the most up-to-date list of installed applications on the client device 105. Additionally, when a notification is to be sent to the client device 105, the online system 130 determines 408 the applications on the client device 105 that can receive the notification. For example, these applications may have been previously registered by the online system 130 as being installed on the client device 105 when each application was initially installed.

Referring to the first scenario where a new notification is automatically forwarded to a second application, the online system 130 first determines that a first application on the client device 105 can receive the notification. Additionally, the online system 130 determines 408 that only one other application (e.g., a second application) is installed on the client device 105 and available to receive a forward notification. Therefore, the online system 130 sends 410 the notification with a serialized payload, the notification configured to automatically display a forward notification associated with the second application if a request to forward the notification is received by the client device 105.

Referring to the second scenario, the online system 130 determines 408 applications of the client 105 that can receive the new notification. In this scenario, the online system 130 determines that there are more than two applications can handle the new notification; therefore, a selection will be needed if a forward notification to a second application is requested. The client device 105 identifies a preferred application of the client device 105 and sends 410 the new notification with the serialized payload to the client device 105 to be displayed. The software application 175 of the client device 105 displays the new notification on the user interface 170 of the client device 105. The client device 105 receives 415 an input indicating a desire to forward the notification.

In various scenarios, the client device 105 communicates with the online system 130 to determine a list of appropriate applications that can receive a forward notification. The client device 105 sends 420 the forward request to forward the notification and also sends 425 the stored list of installed applications. Therefore, the online system 130 is able to gain access to the most up-to-date and comprehensive list of installed applications on the client device 105. The online system 130 analyzes the list of installed applications and selects 430 the applications that are able to receive a forward notification. For example, the online system 130 may maintain a whitelist of applications based on a type of notification (e.g., music, video, chat) and uses the whitelist to filter the appropriate applications that can handle that type of notification accordingly. The online system 130 sends 435 the list of appropriate applications to the client device 105.

The client device 105 presents 440 the list of appropriate applications on a user interface 170 of the client device 105 and receives 445 a selection of one application (e.g., second application) to receive the forward notification. The client device 105 displays 450 the forward notification associated with the selected application.

Forwarding a Notification from App/Device-to-App/Device

Figure 5:
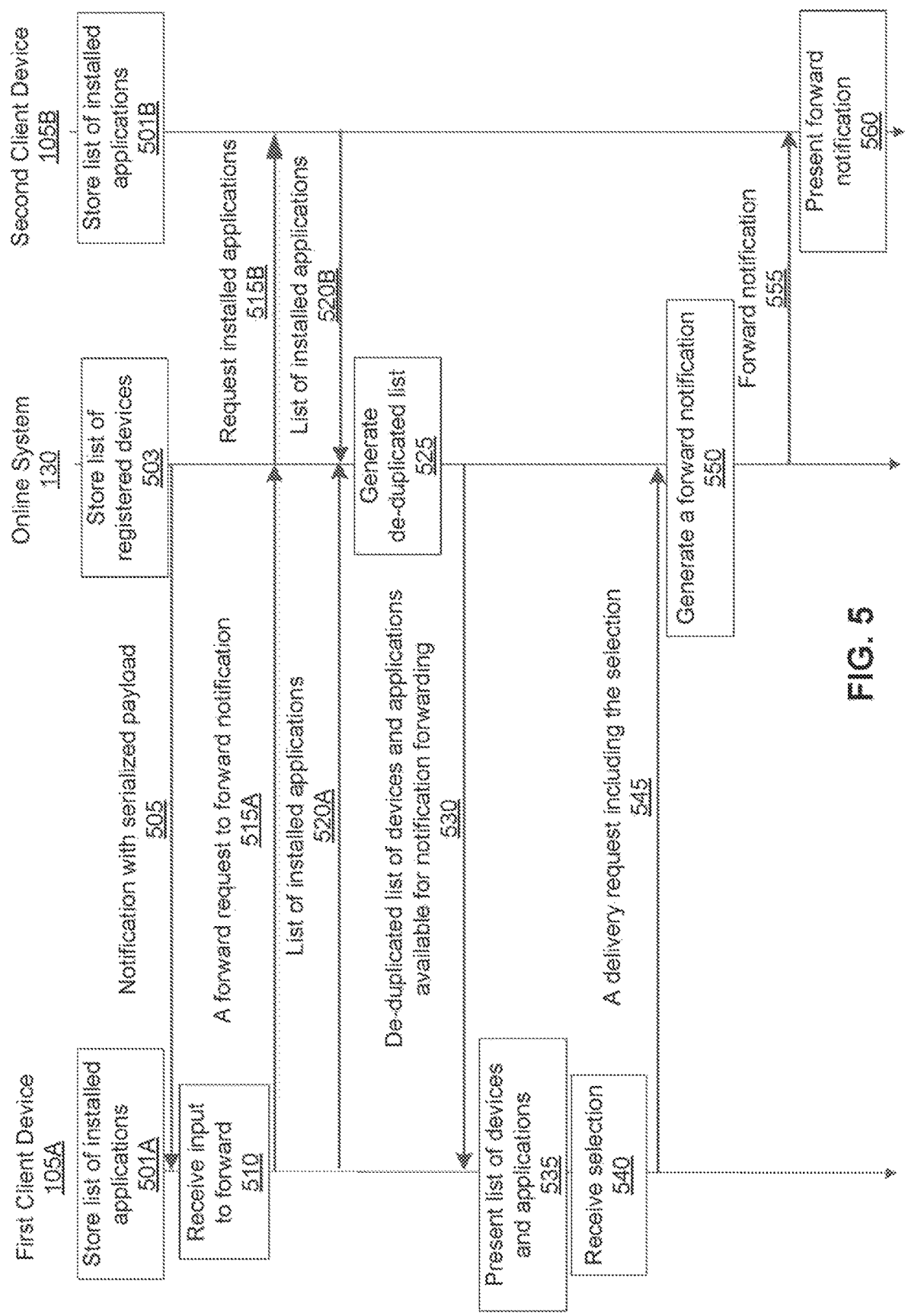
FIG. 5 depicts an interaction diagram for forwarding notifications from a first application of a first client device to a second application on a second client device, in accordance with an embodiment.

FIG. 5 depicts an interaction diagram for forwarding notifications from a first application of a first client device to a second application on a second client device, in accordance with an embodiment.

Each of a first client device 105A and a second client device 105B stores 501A/501B a list of installed applications on each respective device. Additionally, the online system 130 stores 503 a list of registered devices registered with a user account of the online system 130. The list of registered devices includes both the first client device 105A and second client device 105B. Additionally, for each client device 105 included on the list of registered devices, the online system 130 also includes information about the applications that are installed on each client device 105 that was stored when each application was installed.

When a trigger for a new notification occurs (e.g., new video or music content is available, a new chat message is available), the online system 130 identifies a first client device 105A and sends 505 the new notification with a serialized payload. The first client device 105A presents the notification on a user interface 170 and receives 510 an input indicating a desire to forward the notification. The first client device 105A sends 515A a forward request to the online system 130.

In some embodiments, the online system 130 additionally sends 515B a request for installed applications on the second device 105B (and each additional client device registered with the user account). The online system 130 receives 520A a first list of installed applications from the first client device 105A and receives 520B a second list of installed applications from the second client device 105B (and installed applications from each additional device). This enables the online system 130 to possess the most up-to-date list of available applications on each client device 105. In other embodiments, the online system 130 has previously stored a list of applications on each client device 105 that are installed and available to receive notifications.

The online system 130 generates 525 a de-duplicated list of options for forwarding a notification. For example, if a second client device 105B includes multiple applications that can receive a forward notification, the online system 130 generates a de-duplicated list that presents the multiple applications of the second client device 105B, but ensures that the second client device 105B is only presented once in association with the multiple applications. A visual example is shown in regards to the device list 230 and the application list 235 in FIG. 2A. The online system 130 sends 530 the de-duplicated list of devices and applications to the first client device 105A.

The first client device 105A presents 535 the list of client devices and applications and receives 540 a selection of the second client device 105B and application that is to receive the forward notification. The first client device 105A sends 545 the delivery request including the selection of the client device 105B and application to the online system 130.

The online system 130 generates 550 a forward notification that can be properly handled by the second client device 105B. As previously described, the online system 130 can add or remove certain graphical elements to the forward notification based on the capabilities of the second client device 105B. The online system 130 sends 555 the forward notification to the second client device 105B, which then presents 560 the forward notification on a user interface 170 of the second client device 105B.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
sending a new notification to a first application on a first client device of a plurality of client devices registered with a user account of an online system;
receiving, by a processing device, a forward request to forward the new notification;
responsive to receiving the forward request:
identifying one or more applications that are able to handle the new notification, wherein the one or more applications are on one or more of the client devices registered with the user account of the online system;
selecting, from the one or more applications that are able to handle the new notification, a second application;
generating a forward notification for the second application based on the new notification; and
transmitting the forward notification to the second application.

2. The method of claim 1, wherein the second application is installed on the first client device.

3. The method of claim 1, wherein the second application is installed on a second client device of the plurality of client devices.

4. The method of claim 3, further comprising selecting the second client device based on a user selection of the second application from the one or more applications that are able to handle the new notification.

5. The method of claim 1, further comprising:
determining whether the new notification is specific for an application on the one or more of the client devices registered with the user account of the online system; and
identifying the one or more applications that are able to handle the new notification based on the determination.

6. The method of claim 1, further comprising:
identifying installed applications on each of the one or more of the client devices registered with the user account of the online system; and
selecting the one or more applications that are able to handle the new notification from the identified installed applications.

7. The method of claim 1, wherein generating the forward notification for the second application based on the new notification comprises modifying the new notification based on one or more predetermined settings of the second application.

8. The method of claim 7, wherein modifying the new notification comprises modifying an appearance of the new notification.

9. A system comprising:
a memory; and
a processing device operatively coupled to the memory, the processing device to:
send a new notification to a first application on a first client device of a plurality of client devices registered with a user account of an online system;
receive a forward request to forward the new notification;
responsive to receiving the forward request:
identify one or more applications that are able to handle the new notification, wherein the one or more applications are on one or more of the client devices registered with the user account of the online system;
select, from the one or more applications that are able to handle the new notification, a second application;
generate a forward notification for the second application based on the new notification; and
transmit the forward notification to the second application.

10. The system of claim 9, wherein the second application is installed on the first client device.

11. The system of claim 9, wherein the second application is installed on a second client device of the plurality of client devices.

12. The system of claim 11, wherein the processing device is further to select the second client device based on a user selection of the second application from the one or more applications that are able to handle the new notification.

13. The system of claim 9, wherein the processing device is further to:
identify the one or more applications that are able to handle the new notification based on whether the new notification is specific for an application on the one or more of the client devices registered with the user account of the online system.

14. The system of claim 9, wherein the processing device is further to:
identify installed applications on each of the one or more of the client devices registered with the user account of the online system; and
select the one or more applications that are able to handle the new notification from the identified installed applications.

15. The system of claim 9, wherein, to generate the forward notification for the second application based on the new notification, the processing device is further to modify the new notification based on one or more predetermined settings of the second application.

16. The system of claim 15, wherein modifying the new notification comprises modifying an appearance of the new notification.

17. A non-transitory machine-readable storage medium including instructions that, when accessed by a processing device, cause the processing device to:
send a new notification to a first application on a first client device of a plurality of client devices registered with a user account of an online system;
receive a forward request to forward the new notification;
responsive to receiving the forward request:
identify one or more applications that are able to handle the new notification, wherein the one or more applications are on one or more of the client devices registered with the user account of the online system;
select, from the one or more applications that are able to handle the new notification, a second application;
generate a forward notification for the second application based on the new notification; and
transmit the forward notification to the second application.

18. The non-transitory machine-readable storage medium of claim 17, wherein the second application is installed on the first client device.

19. The non-transitory machine-readable storage medium of claim 17, wherein the second application is installed on a second client device of the plurality of client devices.

20. The non-transitory machine-readable storage medium of claim 17, wherein, to generate the forward notification for the second application based on the new notification, the processing device is further to modify an appearance of the new notification based on one or more predetermined settings of the second application.

\* \* \* \* \*